(12) United States Patent
Clark

(10) Patent No.: X1260
(45) Date of Patent: Apr. 9, 1810

(54) MARLBLE, OR PIPE STONE TURNER

(76) Inventor: David Clark

United States Patent Patent No.: X1260

David Clark a Citizen of
Letters Patent.

The Schedule referred to in these Letters Patent an
making part of the same, containing a description in the wor
of the said David Clark himself of his Marble and pipe Sto
turner.

There is a vertical cogwheel on a horizontal shaft of th
Machine which is turned by water or other force and com
municates motion to a Trundle head standing upright t
trundle head turns by a [illegible] or small spur wheel or vertic
auger for boring stone for pipes for aqueducts or other purpo
and it also turns the bit, or instrument for boring out the hollo
in stone vessels of every description by means of a spur whee
and pinion on the perpendicular shaft of the bit, The stone
be bored by this last mentioned bit is placed in a box or trou
of water under the bit. In one side of the Machine is an Horizo
tal Lathe, turned by a strap which passes round the first vertica
wheel and round a wheel or pully on the Maundrel of th
Lathe the rest for the chissel or turning tool is secured to th
tool and projects beneath it. In all cases where a trough o
water can be used for the stone to lie in whilst turned or e
it must be so placed; and in other cases kept constantly w
during the operation. This Machine is for manufacturi
Bowls, plates, morters and mugs or flat or hollow ware o
every description out of stone or marble as also for bori
and turning aqueduct pipes, Bannesters Urns &c. The numb
and kind of bits or bores are varied according to circum
stances.

Witnesses present
Nichl. King

David Clark

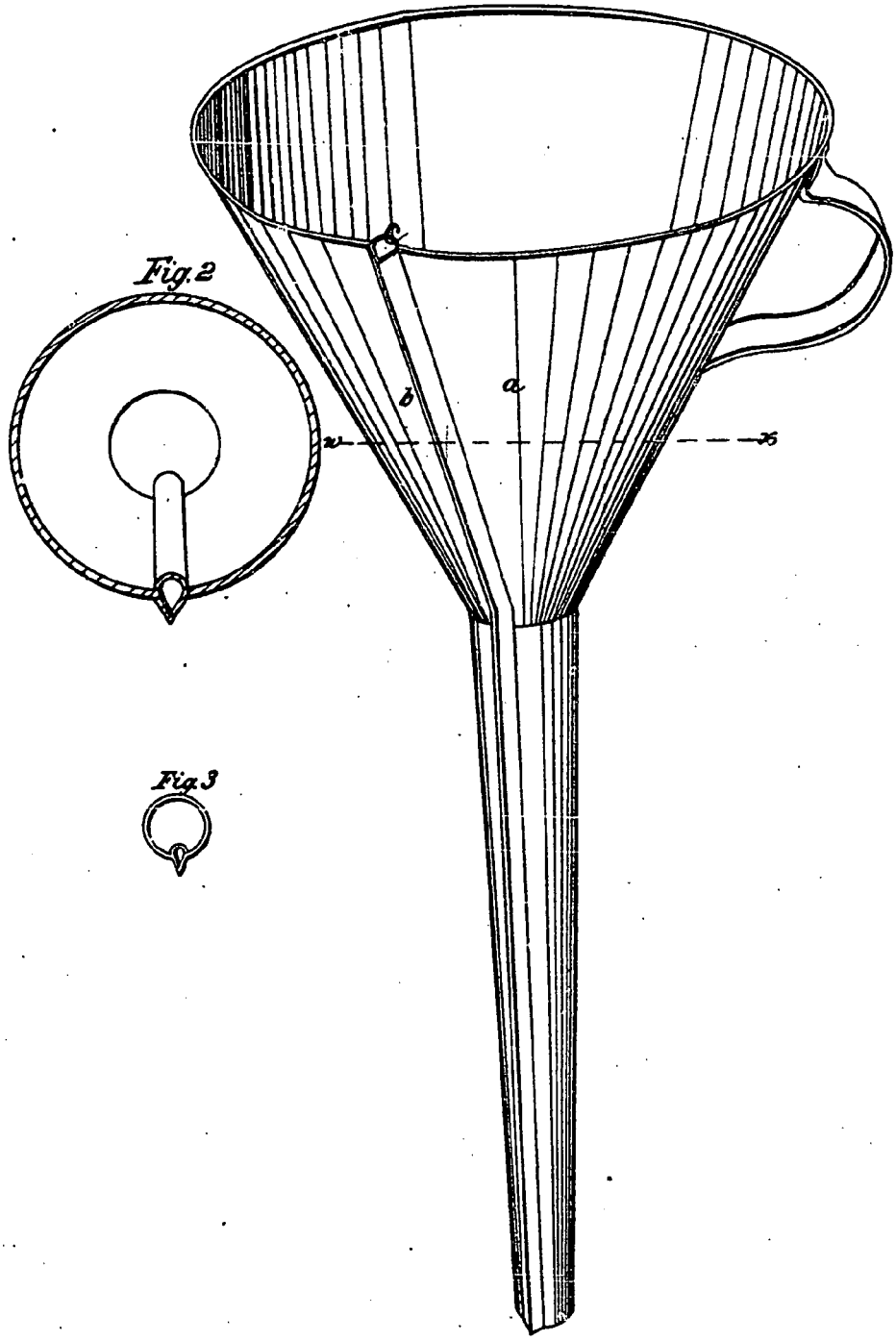

United States Patent
Patent No.: X1260
D. CLARK.
FUNNEL.
*Fig. 1.* Patented Apr. 9, 1810.